United States Patent

Frebourg et al.

[11] Patent Number: 5,834,382
[45] Date of Patent: Nov. 10, 1998

[54] COVERING FOR TOOLS IN CONTACT WITH HOT GLASS

[75] Inventors: Philippe Frebourg, Pontoise; Rene Gy, Bondy; Yasmin Keddad, Rueil Malmaison, all of France

[73] Assignee: Saint-Gobain Vitrage, Courbevoie, France

[21] Appl. No.: 726,935

[22] Filed: Oct. 7, 1996

[30] Foreign Application Priority Data

Oct. 5, 1995 [FR] France ................................. 95 11711

[51] Int. Cl.$^6$ .............................. D03D 17/00; D04B 1/14
[52] U.S. Cl. .............................................................. 442/320
[58] Field of Search ........................... 428/225, 259; 139/425; 60/202; 57/238, 244

[56] References Cited

U.S. PATENT DOCUMENTS 5,388,432  2/1995  Lesage et al. .

FOREIGN PATENT DOCUMENTS

| 0 312 439 | 4/1989 | European Pat. Off. . |
| 0 319 298 | 6/1989 | European Pat. Off. . |
| 0 477 785 | 4/1992 | European Pat. Off. . |
| WO 94/01372 | 1/1994 | WIPO . |
| WO 94/01373 | 1/1994 | WIPO . |

OTHER PUBLICATIONS

Norme Francais, NF EN ISO 9237:1995, Aug. 1995, "Textiles—Détermination de la Perméabilité à l'Air des Étoffes" (with English abstract).

*Primary Examiner*—Johann Richter
*Assistant Examiner*—Taofiq A. Solola
*Attorney, Agent, or Firm*—Oblon, Spivak, McClelland, Maier & Neustadt, P.C.

[57] ABSTRACT

A covering which is resistant to high temperature and intended to be inserted between tools and plates of hot glass includes a knitted fabric formed from an assembly of stitch wales which gives at least one plane face. The knitted fabric is provided with openings, the polygonal shape of which is determined by a plurality of non-bound segments each including a portion of a stitch wale, and of bound segments formed by making more than four stitches common to two adjacent stitch wales. The making common is obtained by the mutual transfer of stitches from one wale to the other.

38 Claims, 3 Drawing Sheets

COVERING FOR TOOLS IN CONTACT WITH HOT GLASS

BACKGROUND OF THE INVENTION

FIELD OF THE INVENTION

The present invention relates to coverings which are resistant to high temperature, especially containing metal, and intended particularly for serving as inserts between plates of hot glass and any tool which comes into contact with them.

The present invention relates more particularly to coverings for tools used in installations for the hot treatment of glass sheets for the purpose of producing glazings of the annealed, bulged, tempered and enameled type, especially the glazings used in the motor vehicle industry. It is to be understood that "hot" refers to temperatures which make it possible to soften glass, for example from 600° to 700° C., but the invention is not limited to uses at temperatures as high as this. Tools which are capable of being equipped with "insert" coverings and which may therefore be mentioned are those intended for shaping and/or treating the glass sheets, such as bulging and/or air-tempering molds, which may be solid or annular, or shaping molds suitable for so-called contact tempering. They may also be tools for transporting the glass plates, especially conveyor rollers, or any other means of mechanical or pneumatic gripping.

DISCUSSION OF THE BACKGROUND

Any handling of a hot glass sheet risks marking it and affecting its optical quality. Now the manufacture of glazings necessitates a high optical quality, which presents problems especially with regard to glazings for motor vehicles, where it is also necessary to ensure excellent definition of the outline, together with complex shapes which may comprise a plurality of deflection points usually requiring an operation to press the glass sheet between two complementary bulging molds of the solid mold type associated with an annular mold.

To avoid the formation of pits in the glass, to absorb possible dust which may infiltrate at the glass/tool interface or, more generally, to preserve the intactness of the surface state of the glass sheets, it is therefore known to provide the tools with a suitable so-called insert covering which can ensure that the sheets have flexible and soft contact. Moreover, this covering must possess sufficient mechanical durability under hot conditions, some deformability so as to be capable of matching complex tool shapes, but also adequate air permeability, especially if it is to cover tempering tools, as well as a thermal conductivity which is not too high.

A covering meeting all these requirements is already described in the patent EP-B-0,312,439: this consists of a metallic fabric which has a thermal conductivity below 3 $W \cdot m^{-1} \cdot K^{-1}$ and which is formed from tufts consisting of a plurality of at least 90 elementary threads of a diameter smaller than 50 microns. The tufts are organized together to form stitches.

SUMMARY OF THE INVENTION

An object of the invention is to propose an improvement to this type of metallic covering, especially in order to obtain a covering which further reduces the risks of marking and/or which has increased durability.

The present invention relates to a covering which is resistant to high temperature and intended to be inserted between tools and plates of hot glass. This covering comprises a knitted fabric formed from an assembly of stitch wales giving at least one plane face. The knitted fabric is provided, furthermore, with openings, the polygonal shape of which is determined by a plurality of "non-bound" segments, each including a portion of a stitch wale, and of "bound" segments formed by making more than four stitches common to two adjacent stitch wales, this making common being obtained by the mutual transfer of stitches from one wale to the other. For a knitted fabric having two plane opposite faces, this making common can especially involve more than two stitches from two adjacent stitch wales.

According to the invention, it is understood that "stitch" relates to an elementary thread loop connected to the other loops to form the segments of the knitted fabric.

It is also understood that "opening" relates to free space delimited by the segments.

It is also understood that "knitted fabric" relates to both tuck-stitch knits and cast-stitch knits. Within the context of the invention, this term also embraces cloths, netting, cane plaitings and braids. (It should be noted that, as regards to tuck-stitch knits, stitch "rows" is referred to rather than stitch "wales").

It is also understood that "mutual transfer of stitches" relates to a connection made between two stitch wales, in such a way that the thread of a given stitch wale is inserted into the adjacent wale to form at least one stitch there, and that, conversely, the thread of the latter wale is inserted into the first wale to form at least one stitch there. There are, therefore, at least two stitches "made common" to the wales within the meaning of the invention. Likewise, by knitted fabric with at least one "plane face" is meant a knitted fabric, of which all the stitch wales of at least the same face are plane.

The covering, as defined above, has many advantages. The fact that it is a knitted fabric gives it some extensibility in all directions, thus allowing it to be used for covering tools of complex shapes, for example having a pronounced curvature. The texture of the knitted fabric makes it sufficiently absorbent to dust. Moreover, giving this knitted fabric a plane face makes it possible to avoid any marking of the glass sheets, since it offers very smooth contact. The fact that the two opposite faces of the knitted fabric advantageously have this characteristic makes it possible to use it without any longer having to distinguish between a "right" face and a "wrong" face. However, in some less demanding uses and especially for practical convenience, it is possible to employ only a knitted fabric having a single plane face. By selecting the size and geometry of the openings in the knitted fabric, the permeability coefficient of the covering can be set accurately, this being important if it is intended for equipping air-tempering molds.

Finally, the knitted fabric has high resistance to mechanical wear. In fact, the above-mentioned openings have strong cohesion, in that there are at least two stitches in the "bound" segments which are a result of the interaction between two stitch wales, and this means that, if one of these "common" stitches were ever to break in the event of prolonged use, at least one second "common" stitch would remain. This avoids any risk of an abrupt local rupture of the covering, giving rise to direct point contact between the tool and hot glass and consequently to marking of the latter.

These openings according to the invention can therefore have highly diverse shapes. Thus, they can be symmetrical, in particular having bound segments all of the same length and non-bound segments likewise all of the same length. However, they can just as easily be asymmetric, with bound and non-bound segments of different lengths. The structure of the knitted fabric according to the invention therefore affords numerous possibilities for adapting the covering as closely as possible to its ultimate use. It is possible, for example, to adopt openings having a hexagonal shape, creating a cellular or even honeycomb appearance.

Moreover, the size and/or shape of the openings may vary over the knitted fabric as a whole, thus producing in the knitted fabric knitting zones of different appearance and properties. In fact, it may be advantageous to adopt, for example, a differentiated permeability in the knitted fabric, in particular by distinguishing between a peripheral zone and a central one, when it is intended for covering a solid mold.

Usually, however, a size of openings is selected such that they have a perimeter of between 8 and 80 millimeters, preferably between 20 and 80 millimeters. As a consequence of the structure of the knitted fabric, these opening have some deformability, but their perimeter remains substantially constant.

Advantageously, the stitches are knitted from single or composite spun thread. This type of thread is obtained, for example, from a continuous sliver of elementary threads which undergoes mechanical cracking so as to break it into short discontinuous fibers of random length, cracking being followed by one or more twists (single spun thread) and then, if appropriate, by doubling to fix the twists (composite spun thread). Any other type of spinning operation terminating in a similar result can be used, in particular so-called "air-jet" spinning.

This type of thread is appropriate to use, first because, although metallic, its thermal conductivity is relatively low, this being somewhat advantageous if the glass undergoes thermal treatment and/or is capable of having a temperature slightly different from that of the tool. Furthermore, the fact that it includes discontinuous fibers improves the "softness" of the knitted fabric and gives it high flexibility in terms of thickness. Lastly, the spun thread is particularly suitable for the knitting operation on account of its flexibility. In fact, the discontinuous fibers give the spun thread a particular appearance, with so-called marginal fibers, one end of which is wedged by twisting in the thread and the other end of which projects, thus making it possible, in particular, to distribute the weight of the glass sheet over the knitted fabric as a whole in the best possible way. Everything about such a thread thus assists in reserving the optical quality of the glass.

The thread which is knitted may be single, in particular having a metric count of between 1 and 30, in particular between 1.5 and 10, when it is made of metal of the steel type (the metric count indicates the thread length necessary, in meters, to obtain a mass of 1 gram). If the thread is not made of steel, but, for example, of ceramic material or of another metal, these metric count values have to be weighted as a function of the ratio of the densities between the metal and the material in question, so that the apparent diameter of the thread is comparable. Thus, for a thread, the elementary fibers of which are four times less dense than metal of the steel type, the above-indicated limit values of the metric count would have to be multiplied by four.

An assembly of a plurality of these threads, especially 2 to 5 threads, can also be knitted, this assembly not necessarily requiring a doubling operation.

Preferably, the thread from which the knitted fabric is made includes at least 90 elementary fibers, each elementary fiber having a diameter smaller than 50 micrometers, in particular between 8 and 80 micrometers.

In fact, the two parameters, which are, on the one hand, the number of elementary fibers of each thread and, on the other hand, the number of assembled threads, make it possible to vary, as desired, the thread size which would actually be knitted and therefore, ultimately, the thickness of the knitted fabric. A third parameter, which is the number of twists which the thread has undergone before it is knitted, can also have an effect.

Referring now more specifically to the type of material forming the knitted fabric according to the invention, it must be resistant to high temperature, which is why a knitted fabric comprising metallic threads can advantageously be selected. Moreover, it can include mainly or even completely metallic threads. However, it is also possible to incorporate in the knitted fabric, in addition to these metallic threads, heat-resistant non-metallic threads, in particular based on ceramic material, silicon carbide, polyimide or aromatic polyamide, such as the polymer known by the tradename KEVLAR. As seen above, these threads, whether metallic or not, can result from the combination of a particular number of elementary threads.

In another alternative, the knitted fabric comprises "hybrid" threads, that is to say threads containing a mixture of metallic elementary fibers and of non-metallic elementary fibers of the ceramic, silicon carbide, polyimide or aromatic polyamide type.

The threads or elementary fibers of the knitted fabric which are metallic are advantageously selected as being based on stainless steel, especially of the type 316L. A preferred embodiment involves selecting an essentially austenitic steel. The steel comprises, for example, a content by mass of chromium of at least 17%, especially between 17% and 19%, and a content of nickel of at least 12%, especially between 13% and 14%, while preserving a content by mass of carbon less than or equal to 0.03%. This type of steel has, in fact, very good resistance to oxidation at high temperature and very high mechanical durability, this ensuring that the covering has an extended lifetime.

Preferably, the thickness of the covering is selected as less than 5 mm, especially between 1 and 3 mm. Its thermal conductivity conventionally remains below 3 $W \cdot m^{-1} \cdot K^{-1}$, especially 0.1 to 0.2 $W \cdot m^{-1} \cdot K^{-1}$. As seen above, its air permeability can be set at various values. It is, in particular, are least 2 m/s. Permeability is defined, here, by the number of cubic meters capable of passing in one second through the equivalent of one square meter of the material when the pressure difference on either side of the latter is 200 Pa (pascal). The measurement of air permeability is conducted according to the specifications of the standard NF EN ISO 9237 on the basis of a test area of 20 $cm^2$.

When such a covering is used for covering tempering tools, it may be advantageous to have a higher air permeability; in this case, this is, in particular, at least 5 m/s and preferably at least 7 m/s in terms of cubic meters of air capable of passing through the equivalent of one square meter of the material when the pressure difference on either side of the latter is 200 pa (pascal), on the basis of a test area of 20 $cm^2$.

According to one alternative, the two faces of the knitted fabric can have the same structure and the same appearance, but differ from one another in the nature of the threads which form them. Thus, a distinction can be made between the face intended to be the "glass side", made from threads of material specifically optimized to avoid marking, and the face intended to be the "tool side", which can include threads of different, in particular less costly, material (or mixture of materials).

According to another alternative, if the two faces of the knitted fabric are plane, they can also advantageously be identical to one another, thus eliminating any risk of error when the knitted fabric is fastened to the tool.

To obtain knitted fabrics thus having two plane faces, various knitting techniques known from the textile industry can be considered. One of them involves sing a so-called double-section knitting machine: that is to say, a machine with two rows of needles knitting in parallel, thus producing the stitches which form two plane outer "laps". Moreover, the knitting machine is preferably selected so as to manufacture a cast-stitch knit, of the Raschel machine type. In fact, this type of machine allows a very wide choice of dimensions of knitted fabric, especially as regard to its width. Knitted fabrics in the form of narrow bands can be obtained in this way, this being perfectly suitable for serving as coverings for annular bulging and/or tempering molds. This type of machine also makes it possible to manufacture directly tubular knitted fabrics which can be used, in particular, for covering conveyor rollers.

As mentioned above, the invention also relates to the use of the above-described covering for covering tools for glass plates during their thermal treatment of the annealed, bulging, air-tempering or contact-tempering type, the tools being especially of the type comprising solid molds or bulging and/or tempering frames. It also relates to the use of the covering for covering elements for supporting and/or transporting plates of hot glass, such as conveyor rollers, a conveyor belt, and any means of mechanical or pneumatic gripping, especially by suction.

The present invention therefore relates to a covering which is resistant to high temperature and is intended to be inserted between tools and plates of high glass. The covering comprises a knitted fabric formed from an assembly of stitch wales which gives the knitted fabric at least one plane face. The knitted fabric is provided with openings which have a polygonal shape, with the polygonal shape being determined by a plurality of first segments which can be non-bound segments, each including a portion of a stitch wale, and of second segments which can be bound segments formed by making more than four stitches common to the adjacent stitch wales of the stitch wales. The making common of the four stitches to the two adjacent stitch wales is obtained by a mutual transfer of stitches from one wale to the other.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
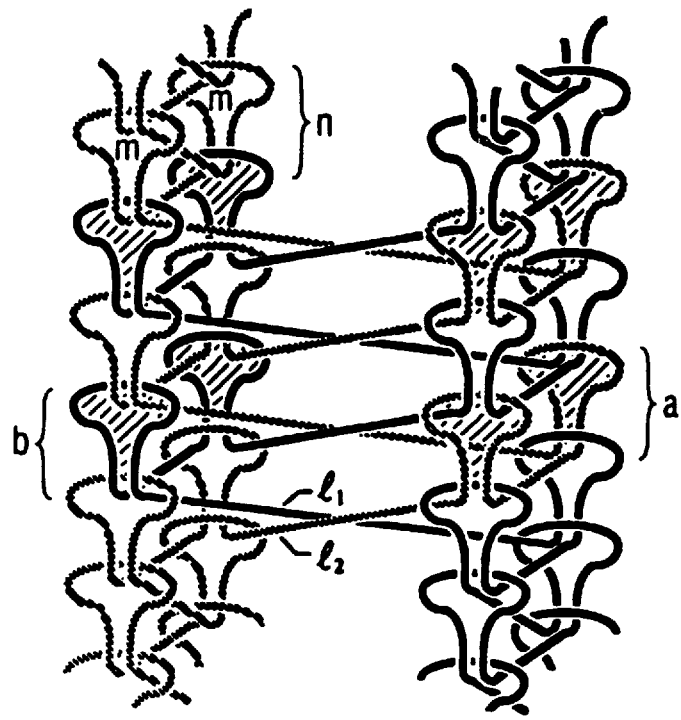
FIG. 1 shows an exploded representation of two portions of adjacent stitch wales of a knitted fabric according to the invention having two plane opposite faces.
Figure 2:
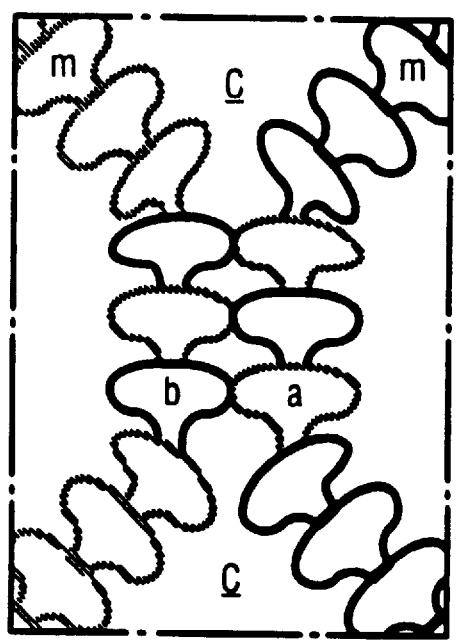
FIG. 2 shows the same portions of wales of the knitted fabric, as seen from the front, the rear face being concealed.

All these figures are highly diagrammatic. They represent different versions of a knitted fabric according to the invention.

Referring now to the drawings, wherein like reference numerals or letters designate identical or corresponding parts throughout the several views; in all the following examples, the knitted fabric is of the cast-stitch type and uses threads made of mainly austenitic stainless steel, comprising a content by mass of chromium of 18%, a content by mass of nickel of 13% and a content by mass of carbon of less than 0.03%.

The threads include two doubled spun threads having a respective metric count of 11 meters per gram, the spun threads including approximately 100 basic filaments of an apparent diameter of 12 micrometers. In the example corresponding to FIGS. 1 to 5, knitting is carried out by means of a so-called double-section Raschel machine of gauge 9 (the gauge is the number of needles arranged over a distance of 1 inch). In the example corresponding to FIG. 6, knitting is carried out by means of a machine of the single-section Raschel type.

Referring to FIG. 1, this shows in exploded form two adjacent stitch wales A, B of a knitted fabric according to the invention. Each wale includes rows "n" comprising two thread stitches (or loops) "m". It can be seen from the figure that what is referred to as "row" is a set of two adjacent stitches (loops) of the same stitch wale, each being arranged on one of the faces of the knitted fabric. To create openings in the knitted fabric, these two stitch wales are made to interact locally and uniformly over their entire length in the following way: a thread $1_1$ coming from the stitch wale B is inserted into the stitch wale A. Conversely, a thread $1_2$ coming from the stitch wale A is inserted into the stitch wale B.

The thread $1_1$ produces a row "b" in the wale A, and the thread $1_2$ produces a row "a" in the wale B. This transfer of threads thus forms a tie between the two wales. As shown in FIG. 1, it can be seen that 4 ties are thus formed in succession, hence with a double transfer of two rows from one wale to the other. The set of the stitches "made common" by these mutual transfers brings the two wales closer together and forms a segment, "bound" within the meaning of the invention, which will make it possible to obtain openings C of variable shape and size. This is represented diagrammatically in FIG. 2, which shows that the 4 ties produced between the wales A and B form a bound segment including altogether 6 rows, i.e., 12 stitches. It is then sufficient to select the number of stitches thus made common and the number of stitches not made common to two wales. For greater clarity, this principle is represented diagrammatically in FIG. 5: the crosses depict making a particular number of stitches common to two wales: in this representation, therefore, each opening C is delimited by two bound segments $s_1$ and $s_2$, and by four non-bound segments $s_3$, $s_4$, $s_5$ and $s_6$, so as to obtain a substantially hexagonal shape.

Figure 3:
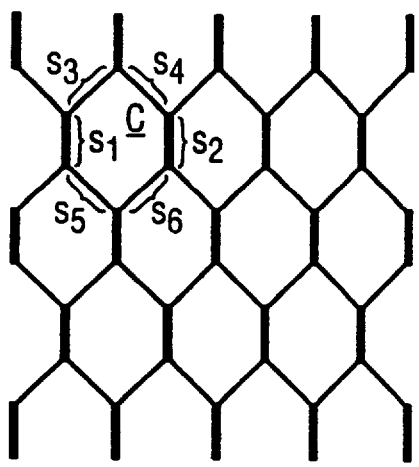
FIGS. 3 and 4 show two alternative shapes of openings in the knitted fabric.
Figure 4:
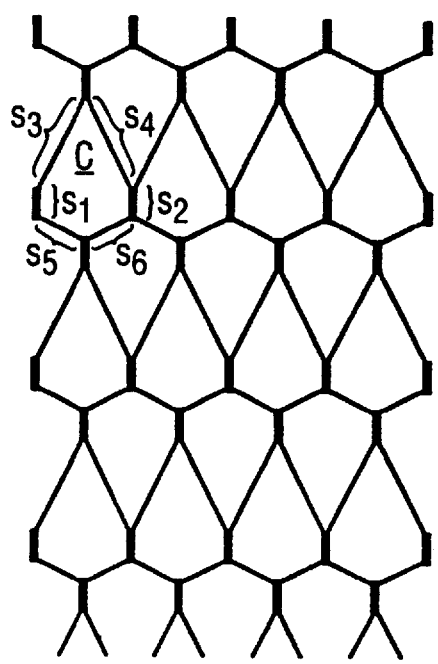
Figure 5:
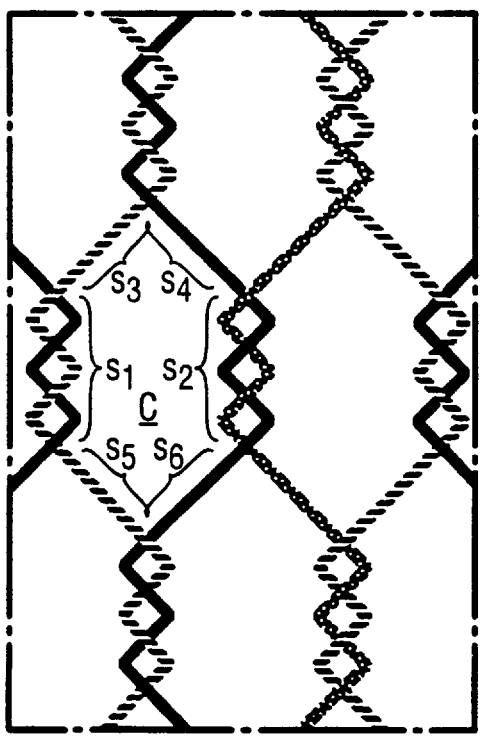
FIG. 5 shows an enlarged diagrammatic view of an opening according to FIG. 3.

FIGS. 3 and 4 show two types of openings C even more diagrammatically: FIG. 3 has, once again, a symmetrical hexagonal pattern with two bound segments $s_1$, $s_2$ of the same length, comprising, for example, 6 rows in common, and four non-bound segments $s_3, s_4, s_5, s_6$ of the same length and comprising, for example, 2 rows. In FIG. 4, the openings are this time asymmetric, again of hexagonal shape, but with two bound segments $s_1, s_2$ of the same length and comprising 2 rows in common, two non-bound segments $s_3, s_4$ of the same length and each comprising 2 rows, and two nonbound segments $s_5, s_6$ of the same length and each comprising 4 rows.

Many alternatives are, of course, possible: for example, the openings can be diamond-shaped, especially when the length of the bound segments is very small in relation to the length of the non-bound segments.

The fabric obtained by double-section knitting has substantially two identical and highly plane opposite faces, this being excellent in terms of optical quality: in fact, there are stitch wales which have an approximately "square" cross-section and two opposite faces of which form those of the knitted fabric.

It is possible to insert at least one additional thread between the two "laps" of stitches forming the outer faces of the knitted fabric, in order to reduce a three-dimensional structure, the thickness and flexibility of which can be controlled by the nature, number and length of the threads joining the two laps of stitches.

Figure 6:
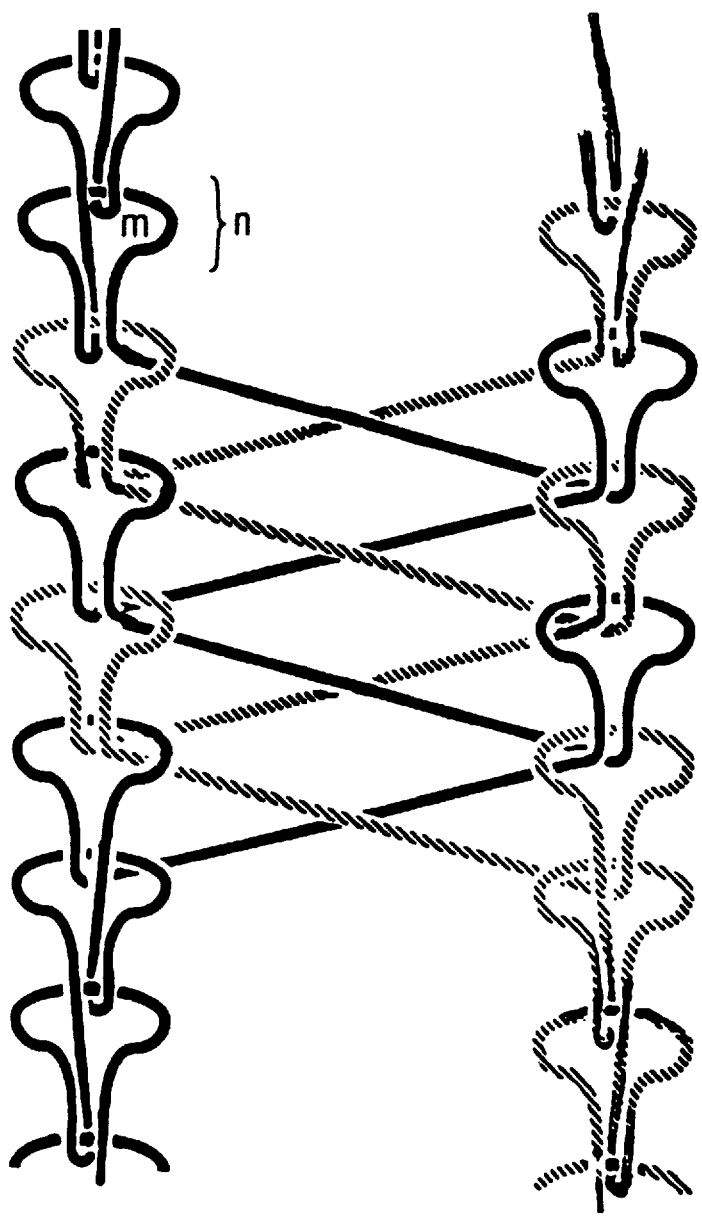
FIG. 6 shows an exploded representation of two portions of adjacent stitch wales of a knitted fabric according to the invention having one plane face.

FIG. 6 shows in exploded form two adjacent stitch wales (A, B) of another knitted fabric with one plane face according to the invention. In contrast to the preceding example, each row "n" comprises one thread stitch "m". The interaction of two stitch wales (A, B) takes place in the same way as in the preceding example. By virtue of the mutual transfers, six stitches (m) made common to the two wales (A, B) are obtained.

The ways in which a thread of one wale is inserted into the adjacent wale may differ widely. With regard to FIG. 1, it was seen that the thread $1_1$ produces a row "b" in the wale A and then "returns" to its initial wale B. It would be perfectly possible for it to produce only one stitch "m" there.

It goes without saying that the invention is not limited to this embodiment: it is quite possible for this thread $1_1$, once inserted into the wale A, to "remain" there, so as to produce a plurality of rows (or a plurality of stitches) in succession in this wale. Moreover, it is not obligatory for it to "return" to its wale B, and it can just as easily be inserted subsequently into tho wale (not shown) which is on the other side of the wale A.

As a conclusion, the knitted fabrics which are in the framework of the invention, are provided with openings (C), the polygonal shape of which is determined by a plurality of <<non-bound>> segments each including a portion of a stitch wale, and of <<bound>> segments formed by making at least two stitches (m) common to two adjacent stitch wales (A,B):

The knitted fabrics with one plane face have bound segments formed by the making common of two, four, six or more stitches.

The knitted fabrics with two plane faces have bound segments formed by the making common of four stitches, notably eight or twelve.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A covering resistant to high temperature and intended to be inserted between tools and plates of hot glass, wherein the covering comprises:

a knitted fabric formed from an assembly of stitch wales giving said knitted fabric at least one plane face, the knitted fabric being provided with openings which have a polygonal shape, the polygonal shape being determined by a plurality of first segments each including a portion of a stitch wale, and of second segments formed by making more than four stitches common to two adjacent stitch wales of said stitch wales, the making common of the more than four stitches to the two adjacent stitch wales being obtained by a mutual transfer of stitches from one wale to the other.

2. A covering according to claim 1, wherein the knitted fabric has two plane opposite faces.

3. A covering according to claim 1, wherein the knitted fabric has one plane face.

4. A covering according to claim 1, wherein the knitted fabric comprises metallic threads.

5. A covering according to claim 4, wherein the knitted fabric further comprises nonmetallic threads of the type comprising ceramic fibers, silicon carbide fibers, polyimide fibers or aromatic polyamide fibers.

6. A covering according to claim 1, wherein the knitted fabric comprises hybrid threads containing a mixture of metallic elementary fibers and of non-metallic elementary fibers of the ceramic, silicon carbide, polyimide or aromatic polyamide type.

7. A covering according to claim 6, wherein at least some of the metallic elementary threads or fibers of the knitted fabric are based on stainless steel.

8. A covering according to claim 7, wherein the stainless steel comprises a content by mass of chromium of at least 17%, and a content by mass of nickel of at least 12%.

9. A covering according to claim 1, wherein the openings have a symmetrical shape.

10. A covering according to claim 1, wherein the openings have an asymmetric shape.

11. A covering according to claim 1, wherein the segments determining a shape of the openings include more than two stitches.

12. A covering according to claim 1, wherein the openings have a hexagonal shape.

13. A covering according to claim 1, wherein a size and/or shape of the openings vary or varies over the knitted fabric as a whole, producing knitting zones of different appearance and properties in the knitted fabric.

14. A covering according to claim 1, wherein the openings have a perimeter of between 8 mm and 80 mm.

15. A covering according to claim 1, wherein the stitches of the knitted fabric are cast stitches.

16. A covering according to claim 1, wherein the stitches are knitted from single or composite spun thread.

17. A covering according to claim 1, wherein the stitches are knitted either from a single thread having a metric count of between 1 and 30, when it is metallic, or from an assembly of a plurality of these threads.

18. A covering according to claim 1, wherein the threads from which the knitted fabric is formed includes at least 90 elementary fibers, each elementary fiber having a diameter smaller than 50 micrometers.

19. A covering according to claim 1, wherein a thickness of the knitted fabric is less than 5 mm.

20. A covering according to claim 1, wherein the knitted fabric has a thermal conductivity less than 3 $W \cdot m^{-1} \cdot K^{-1}$.

21. A covering according to claim 1, wherein the knitted fabric has an air permeability of at least 2 m/s according to the standard NF EN ISO 9237.

22. A covering according to claim 1, wherein the knitted fabric has two faces which differ from one another a nature of threads which form them.

23. A covering according to claim 2, wherein the knitted fabric has two identical faces.

24. A covering according to claim 1, wherein said first segments are non-bound segments, and said second segments are bound segments.

25. A covering according to claim 2, wherein the knitted fabric is obtained by means of a double-section knitting machine.

26. A covering according to claim 3, wherein the knitted fabric is obtained by means of a single-section knitting machine.

27. A covering according to claim 7, wherein the stainless steel is of the type 316L and essentially austenitic.

28. A covering according to claim 7, wherein the stainless steel comprises a content by mass of chromium of between 17% and 19%, a content by mass of nickel of between 13% and 14%, and a content by mass of carbon of less than or equal to 0.03%.

29. A covering according to claim 7, wherein the stainless steel comprises a content by mass of chromium of at least 17%, a content by mass of nickel of at least 12%, and a content by mass of carbon of less than or equal to 0.03%.

30. A covering according to claim 9, wherein the symmetrical shape openings include said first segments which are non-bound segments all of the same length, and said second segments which are bound segments all of the same length.

31. A covering according to claim 10, wherein the asymmetric shape opening include said first segments which are non-bound segments and said second segments which are bound segments of different lengths.

32. A covering according to claim 1, wherein the segments determining a shape of the openings include 2 to 10 stitches.

33. A covering according to claim 1, wherein the segments determining a shape of the openings include 2 to 6 stitches.

34. A covering according to claim 1, wherein the openings have a perimeter of between 20 and 40 mm.

35. A covering according to claim 17, wherein the metric count of the single thread is between 1.5 and 10, and the assembly of the plurality of threads comprises 2 to 5 threads.

36. A covering according to claim 18, wherein the diameter of each elementary fiber is between 8 to 20 micrometers.

37. A covering according to claim 19, wherein the thickness of the knitted fabric is between 1 and 3 mm.

38. A covering according to claim 20, wherein the thermal conductivity is between 0.1 and 0.2 $W \cdot m^{-1} \cdot K^{-1}$.

* * * * *